(12) United States Patent
Niizuma (10) Patent No.: US 10,857,893 B2
(45) Date of Patent: Dec. 8, 2020

(54) GROUND-SIDE POWER SUPPLY DEVICE (71) Applicant: IHI Corporation, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 106 days.

(21) Appl. No.: 16/340,399

(22) PCT Filed: Feb. 26, 2018

(86) PCT No.: PCT/JP2018/006983
§ 371 (c)(1),
(2) Date: Apr. 9, 2019

(87) PCT Pub. No.: WO2018/159540
PCT Pub. Date: Sep. 7, 2018

(65) Prior Publication Data
US 2019/0225105 A1 Jul. 25, 2019

(30) Foreign Application Priority Data
Feb. 28, 2017 (JP) ................ 2017-036443

(51) Int. Cl.
*B60L 9/00* (2019.01)
*B60L 50/60* (2019.01)
(Continued)

(52) U.S. Cl.
CPC ............ *B60L 50/60* (2019.02); *B60L 53/12* (2019.02); *B60L 53/305* (2019.02); *B60L 53/31* (2019.02);
(Continued)

(58) Field of Classification Search
CPC ........ B60L 50/60; B60L 53/12; B60L 53/305; B60L 53/31; B60M 7/00; H02J 50/12;
(Continued)

(56) References Cited

U.S. PATENT DOCUMENTS 9,027,723 B2 * 5/2015 Niizuma ................ B60L 53/67
191/10
9,457,678 B2 * 10/2016 Niizuma ................ B60L 53/62
(Continued)

FOREIGN PATENT DOCUMENTS

| JP | 06-139001 A | 5/1994 |
| JP | 2006-102055 A | 4/2006 |

(Continued)

OTHER PUBLICATIONS

International Search Report dated Mar. 27, 2018 for PCT Application No. PCT/JP2018/006983.

*Primary Examiner* — Ryan Jager
(74) *Attorney, Agent, or Firm* — Volpe Koenig (57) ABSTRACT

A ground-side power feeding device includes a ground-side power feeding coil that wirelessly transmits or receives power to or from a vehicle-side power feeding coil mounted in the vehicle via a magnetic field having a first frequency, a light emitting unit that is disposed at any position at least around the ground-side power feeding coil and in an upper portion of the ground-side power feeding coil when the ground-side power feeding coil is seen from above, and a light emitting power transmitting coil that wirelessly transmits power to the light emitting unit. The light emitting unit has a light emitting power receiving coil which wirelessly receives power from the light emitting power transmitting coil via a magnetic field having a second frequency different from the first frequency, and a light emitting body which emits light with power received by the light emitting power receiving coil.

4 Claims, 10 Drawing Sheets (51) Int. Cl.
*H02J 50/12* (2016.01)
*H02J 50/90* (2016.01)
*H02J 50/80* (2016.01)
*B60M 7/00* (2006.01)
*B60L 53/12* (2019.01)
*B60L 53/30* (2019.01)
*B60L 53/31* (2019.01)

(52) U.S. Cl.
CPC .............. *B60M 7/00* (2013.01); *H02J 50/12* (2016.02); *H02J 50/80* (2016.02); *H02J 50/90* (2016.02); *Y02T 10/70* (2013.01)

(58) Field of Classification Search
CPC .......... H02J 50/90; H02J 50/80; Y02T 10/70; Y02T 90/16
USPC ........................................................ 307/9.1
See application file for complete search history.

(56) References Cited

U.S. PATENT DOCUMENTS

| | | | |
|---|---|---|---|
| 9,669,844 B2* | 6/2017 | Niizuma | H02J 50/90 |
| 9,800,092 B2* | 10/2017 | Niizuma | H02J 50/12 |
| 9,854,709 B2* | 12/2017 | Niizuma | H02J 50/90 |
| 2008/0231120 A1 | 9/2008 | Jin | |
| 2009/0040068 A1 | 2/2009 | Oyobe et al. | |
| 2009/0045773 A1* | 2/2009 | Pandya | B60L 53/00 320/108 |
| 2013/0200791 A1 | 8/2013 | Van Herpen et al. | |
| 2014/0084863 A1 | 3/2014 | Nakamura et al. | |
| 2015/0308905 A1* | 10/2015 | Niizuma | B60L 53/122 356/73.1 |
| 2016/0009187 A1* | 1/2016 | Niizuma | B60L 53/124 307/9.1 |
| 2016/0381829 A1* | 12/2016 | Niizuma | H02J 50/10 361/699 |
| 2020/0180447 A1* | 6/2020 | Nishimura | B60L 53/126 |

FOREIGN PATENT DOCUMENTS

| | | |
|---|---|---|
| JP | 2007-097345 A | 4/2007 |
| JP | 2008-236916 A | 10/2008 |
| JP | 2011-050163 A | 3/2011 |
| JP | 2014-501034 A | 1/2014 |
| JP | 2014-236539 A | 12/2014 |
| JP | 2016-015843 A | 1/2016 |
| JP | 2016-127660 A | 7/2016 |
| WO | 2012/169047 A1 | 12/2012 |

* cited by examiner

GROUND-SIDE POWER SUPPLY DEVICE

TECHNICAL FIELD

The present disclosure relates to a ground-side power feeding device.

BACKGROUND ART

For example, there is a system for wirelessly feeding power between a power receiving coil of a vehicle-side power receiver mounted in a vehicle and a power transmitting coil of a ground-side power transmitter installed on a traveling road surface on which the vehicle travels, via a magnetic field. For example, Patent Literature 1 discloses such a system.

CITATION LIST

Patent Literature

Patent Literature 1: Japanese Unexamined Patent Publication No. 2014-236539

SUMMARY OF INVENTION

Technical Problem

Here, a mark indicating an installation position of a power transmitting coil is sometimes provided in a ground-side power transmitter such that a driver or the like of a vehicle can ascertain the installation position of the power transmitting coil. In addition, regarding this mark, for example, sometimes a light emission-type mark including a light emitting body such as an LED is used such that the mark is easily visible even at night. In this case, the mark is required to be easily replaceable when a malfunction or the like occurs in the light emitting body.

Therefore, the present disclosure describes a ground-side power feeding device including a light emitting unit which can be easily replaced.

Solution to Problem

According to an aspect of the present disclosure, there is provided a ground-side power feeding device that is installed on a traveling road surface, on which a vehicle travels, and wirelessly transmits or receives power to or from the vehicle. The ground-side power feeding device includes a ground-side power feeding coil that wirelessly transmits or receives power to or from a vehicle-side power feeding coil mounted in the vehicle via a magnetic field having a first frequency, a light emitting unit that is disposed at any position at least around the ground-side power feeding coil and in an upper portion of the ground-side power feeding coil when the ground-side power feeding coil is seen from above, and a light emitting power transmitting coil that wirelessly transmits power to the light emitting unit. The light emitting unit has a light emitting power receiving coil which wirelessly receives power from the light emitting power transmitting coil via a magnetic field having a second frequency different from the first frequency, and a light emitting body which emits light with power received by the light emitting power receiving coil.

Effects of Invention

According to the present disclosure, a light emitting unit provided in a ground-side power feeding device can be replaced easily.

DESCRIPTION OF EMBODIMENT

According to an aspect of the present disclosure, there is provided a ground-side power feeding device that is installed on a traveling road surface, on which a vehicle travels, and wirelessly transmits or receives power to or from the vehicle. The ground-side power feeding device includes a ground-side power feeding coil that wirelessly transmits or receives power to or from a vehicle-side power feeding coil mounted in the vehicle via a magnetic field having a first frequency, a light emitting unit that is disposed at any position at least around the ground-side power feeding coil and in an upper portion of the ground-side power feeding coil when the ground-side power feeding coil is seen from above, and a light emitting power transmitting coil that wirelessly transmits power to the light emitting unit. The light emitting unit has a light emitting power receiving coil which wirelessly receives power from the light emitting power transmitting coil via a magnetic field having a second frequency different from the first frequency, and a light emitting body which emits light with power received by the light emitting power receiving coil.

In this ground-side power feeding device, power is wirelessly transmitted from the light emitting power transmitting coil to the light emitting power receiving coil provided in the light emitting unit. That is, there is no need to directly connect the light emitting unit and a power source provided on the traveling road surface side to each other using a wiring. Moreover, since no wiring is required, the light emitting unit can be accommodated in an independent casing. Therefore, in the ground-side power feeding device, only the light emitting unit can be replaced easily. In addition, a frequency (first frequency) at the time at which the ground-side power feeding coil or the vehicle-side power feeding coil receives power and a frequency (second frequency) at the time at which the light emitting power receiving coil receives power are different from each other. Therefore, it is possible to independently control power transmission and power reception between the ground-side power feeding coil and the vehicle-side power feeding coil, and light emission of the light emitting unit.

The light emitting power transmitting coil and the light emitting power receiving coil may be disposed around the ground-side power feeding coil when the ground-side power feeding coil is seen from above. In this case, the light emitting power transmitting coil and the light emitting power receiving coil can be prevented from affecting power transmission and power reception between the ground-side power feeding coil and the vehicle-side power feeding coil. Moreover, power transmission and power reception between the ground-side power feeding coil and the vehicle-side power feeding coil can be prevented from affecting the light emitting power transmitting coil and the light emitting power receiving coil.

The ground-side power feeding device may further include a light emission control unit that controls a state of power transmission from the light emitting power transmitting coil to the light emitting power receiving coil, and a ground-side communication unit that performs communication with the vehicle. The light emission control unit may start power transmission from the light emitting power transmitting coil to the light emitting power receiving coil when a light emission start signal is received by the ground-side communication unit, and may stop power transmission from the light emitting power transmitting coil to the light emitting power receiving coil before the ground-side power feeding coil starts power transmission or power reception between the ground-side power feeding coil and the vehicle-side power feeding coil after power transmission from the light emitting power transmitting coil to the light emitting power receiving coil has started. Here, the light emitting unit is required to indicate an installation position of the ground-side power feeding coil for a vehicle approaching the ground-side power feeding device. In addition, when power transmission and power reception are performed between the vehicle-side power feeding coil and the ground-side power feeding coil, a vehicle has already stopped at a position where power transmission or power reception can be wirelessly performed between the ground-side power feeding coil and the vehicle-side power feeding coil. That is, there is no need to indicate the installation position of the ground-side power feeding coil for a vehicle, and the light emitting unit does not have to emit light. Therefore, the light emission control unit starts power transmission from the light emitting power transmitting coil to the light emitting power receiving coil to cause the light emitting unit to emit light when a light emission start signal is received. The light emission control unit stops power transmission to the light emitting power receiving coil to stop the light emitting unit emitting light before power transmission or power reception between the ground-side power feeding coil and the vehicle-side power feeding coil starts. Accordingly, the ground-side power feeding device can cause the light emitting unit to suitably emit light in accordance with a timing required for the light emitting unit. In addition, since the light emitting unit emits light only when required, the fine view of the region, in which the ground-side power feeding device is installed, is not impaired.

Hereinafter, an embodiment of the present disclosure will be described with reference to the drawings. In description of the drawings, the same reference signs are applied to the same elements, and duplicated description will be omitted.

Figure 1:
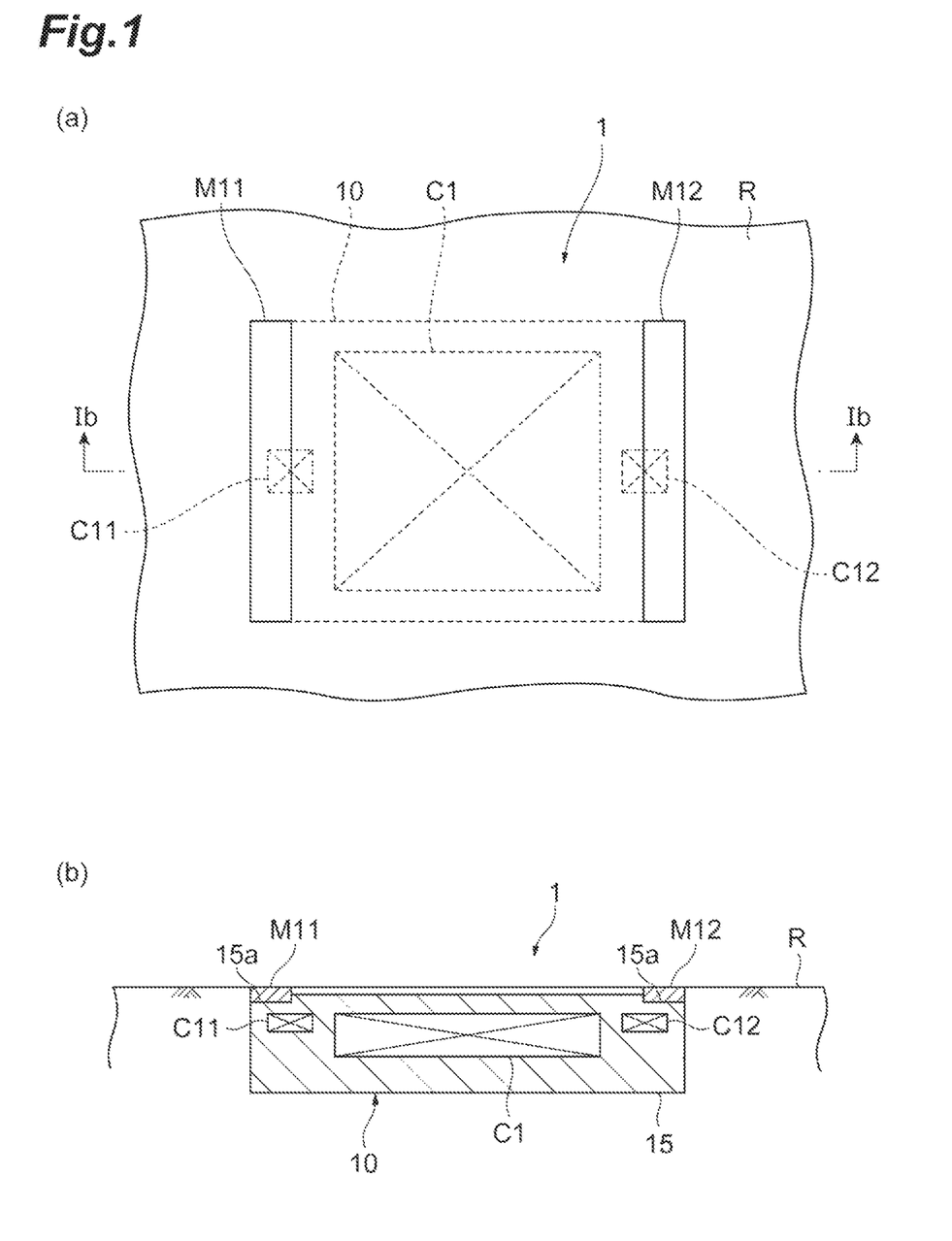
FIG. 1(a) is a view of a ground-side power feeding device according to an embodiment seen from above.
FIG. 1(b) is a cross-sectional view taken along line Ib-Ib in FIG. 1(a).
Figure 2:
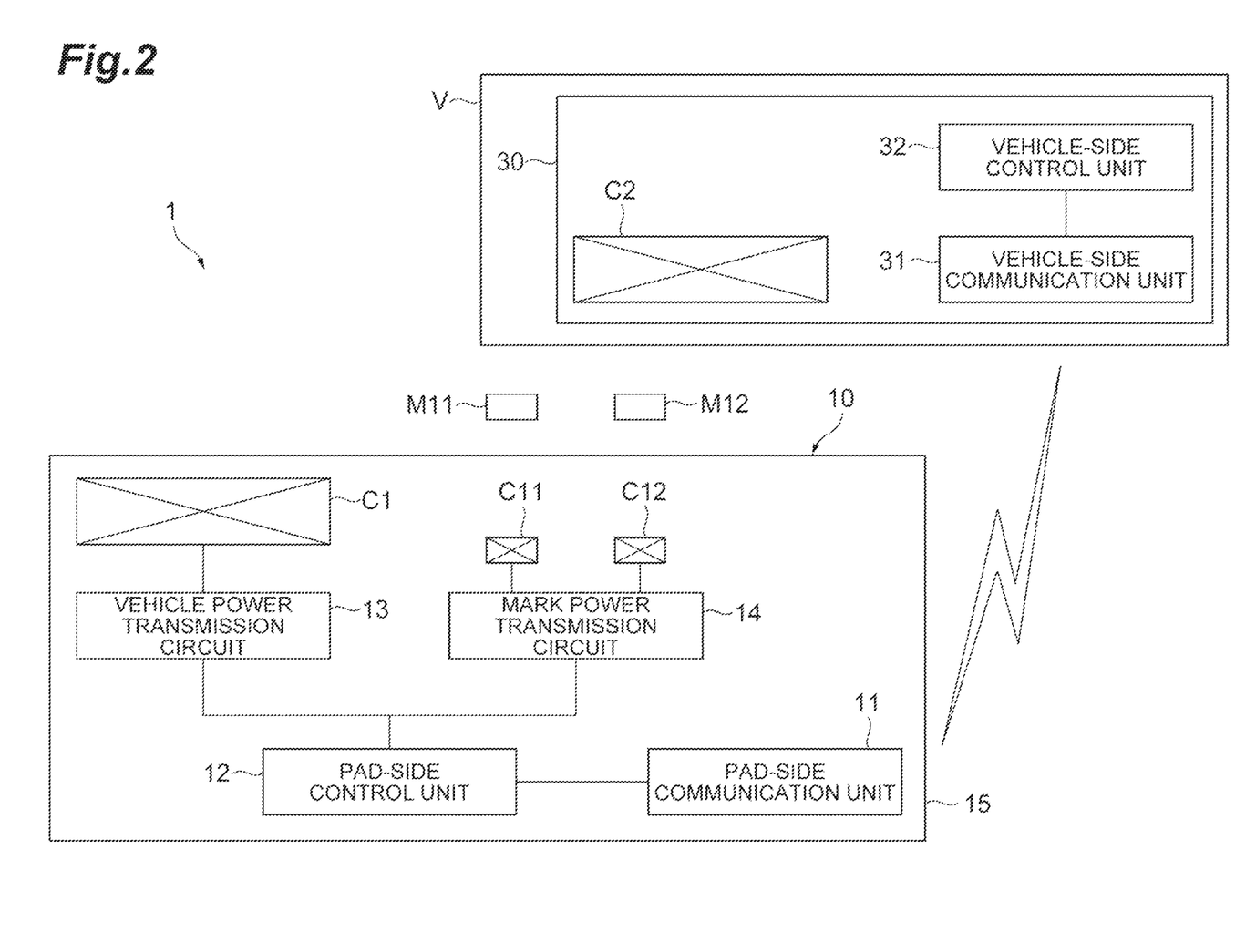
FIG. 2 is a block diagram illustrating a functional configuration of the ground-side power feeding device and a vehicle-side power feeding device.

As illustrated in FIGS. 1($a$), 1($b$), and 2, a ground-side power feeding device 1 wirelessly transmits power to a vehicle-side power feeding device 30. For example, the vehicle-side power feeding device 30 is mounted in a vehicle V which is an electric automobile. The ground-side power feeding device 1 supplies power to the vehicle-side power feeding device 30 of the vehicle V which has arrived in a parking lot or the like, by utilizing magnetic coupling (a magnetic field resonance system, an electromagnetic induction system, or the like) between coils. A wireless power transfer system is not limited to a system utilizing magnetic coupling. For example, an electric field resonance system may be adopted.

The ground-side power feeding device 1 includes a wireless power transfer pad 10, a mark (light emitting unit) M11, and a mark (light emitting unit) M12. The wireless power transfer pad 10 is installed (embedded) under a traveling road surface R in a parking lot or the like. The wireless power transfer pad 10 wirelessly transmits power to the vehicle-side power feeding device 30 of the vehicle V via a magnetic field. In addition, the wireless power transfer pad 10 wirelessly transmits power to the marks M11 and M12 via a magnetic field. The marks M11 and M12 emit light with power transmitted from the wireless power transfer pad 10.

More specifically, the wireless power transfer pad 10 includes a pad-side communication unit (ground-side communication unit) 11, a pad-side control unit (light emission control unit) 12, a vehicle power transmission circuit 13, a mark power transmission circuit 14, a pad casing 15, a ground-side power feeding coil C1, a light emitting power transmitting coil C11, and a light emitting power transmitting coil C12. In FIG. 1($b$) and the like, the pad-side communication unit 11, the pad-side control unit 12, the vehicle power transmission circuit 13, and the mark power transmission circuit 14 are not illustrated. However, the pad-side communication unit 11 and the like are disposed at predetermined positions inside the pad casing 15.

The pad-side communication unit 11 has a function of performing radio communication with the vehicle V (vehicle-side communication unit 31). The pad-side control unit 12 outputs a vehicle power feeding signal to the vehicle power transmission circuit 13 based on a communication result of the pad-side communication unit 11. In addition, the pad-side control unit 12 outputs a mark power feeding signal to the mark power transmission circuit 14 based on a communication result of the pad-side communication unit 11. As will be described below, an upper surface of the pad casing 15 is formed of a material which does not affect the magnetic field. Therefore, electric waves of radio communication are transmitted through the upper surface of the pad casing 15 and arrive at the vehicle V (vehicle-side communication unit 31).

That is, the pad-side control unit 12 controls a state of power transmission (ON/OFF of power transmission) from the ground-side power feeding coil C1 to a vehicle-side power feeding coil C2 of the vehicle-side power feeding device 30. Similarly, the pad-side control unit 12 controls a state of power transmission (ON/OFF of power transmission) from the light emitting power transmitting coil C11 to the mark M11 and a state of power transmission (ON/OFF of power transmission) from the light emitting power transmitting coil C12 to the mark M12.

In addition, the pad-side control unit 12 issues an instruction or the like for turning on and turning off the marks M11 and M12 based on an instruction from the vehicle-side power feeding device 30 via the pad-side communication unit 11. For example, the pad-side control unit 12 is constituted of an electronic control unit (ECU) including a central processing unit (CPU), a read only memory (ROM), and a random access memory (RAM).

When a vehicle power feeding signal is received from the pad-side control unit 12, the vehicle power transmission circuit 13 generates AC power having a high frequency (which will hereinafter be referred to as the first frequency, and the first frequency is 100 kHz, for example) suitable for wireless power transfer from power supplied by a power source (not illustrated) or the like. For example, means for generating AC power is an inverter circuit which switches a power MOSFET. The vehicle power transmission circuit 13 supplies the generated AC power to the ground-side power feeding coil C1.

The ground-side power feeding coil C1 generates a magnetic field with AC power supplied from the vehicle power transmission circuit 13. This magnetic field is an AC magnetic field which varies in a sinusoidal shape over time. In addition, for example, a resonant capacitor is provided in the ground-side power feeding coil C1, so that highly efficient wireless power transfer can be performed by setting the resonance frequency to the first frequency. That is, in a state in which the vehicle V has stopped at a power feeding position set in advance, the ground-side power feeding coil C1 wirelessly transmits power to the vehicle-side power feeding coil C2 mounted in the vehicle V, via a magnetic field having the first frequency.

When a mark power feeding signal is received from the pad-side control unit 12, the mark power transmission circuit 14 generates AC power having a high frequency (which will hereinafter be referred to as the second frequency, and the second frequency is 10 MHz, for example) suitable for wireless power transfer from power supplied by a power source (not illustrated) or the like. For example, means for generating AC power is an inverter circuit which switches a MOSFET. The mark power transmission circuit 14 supplies the generated AC power to the light emitting power transmitting coils C11 and C12.

The light emitting power transmitting coils C11 and C12 are disposed around the ground-side power feeding coil C1 when the ground-side power feeding coil C1 is seen from above. Here, being seen from above denotes that the traveling road surface R side is seen from above the traveling road surface R (side opposite to the underground side with respect to the traveling road surface R). The light emitting power transmitting coils C11 and C12 generate magnetic fields with AC power supplied from the mark power transmission circuit 14. This magnetic field is an AC magnetic field which varies in a sinusoidal shape over time. In addition, for example, resonant capacitors are respectively provided in the light emitting power transmitting coils C11 and C12, so that highly efficient wireless power transfer can be performed by setting the resonance frequency to the second frequency. That is, the light emitting power transmitting coil C11 wirelessly transmits power to the mark M11 (specifically, a light emitting power receiving coil C21 illustrated in FIG. 3) via a magnetic field having the second frequency. Similarly, the light emitting power transmitting coil C12 wirelessly transmits power to the mark M12 via a magnetic field having the second frequency.

The pad casing 15 accommodates the pad-side communication unit 11, the pad-side control unit 12, the vehicle power transmission circuit 13, the mark power transmission circuit 14, the ground-side power feeding coil C1, the light emitting power transmitting coil C11, and the light emitting power transmitting coil C12 which have been described above. At least the upper surface of the pad casing 15 is formed of a material which does not affect the magnetic field (for example, a resin).

The marks M11 and M12 are embedded under the traveling road surface R such that upper surfaces are exposed to the traveling road surface R. The marks M11 and M12 are formed to have strip shapes when seen from above and extend parallel to each other. In the present embodiment, the marks M11 and M12 are disposed around the ground-side power feeding coil C1 when the ground-side power feeding coil C1 is seen from above. Specifically, the marks M11 and M12 are disposed such that the ground-side power feeding coil C1 is interposed therebetween when seen from above. The marks M11 and M12 indicate the installation position of the ground-side power feeding coil C1 by emitting light. As an example, the marks M11 and M12 extend in an entering direction of the vehicle V entering a place on the wireless power transfer pad 10 for power feeding.

Figure 3:
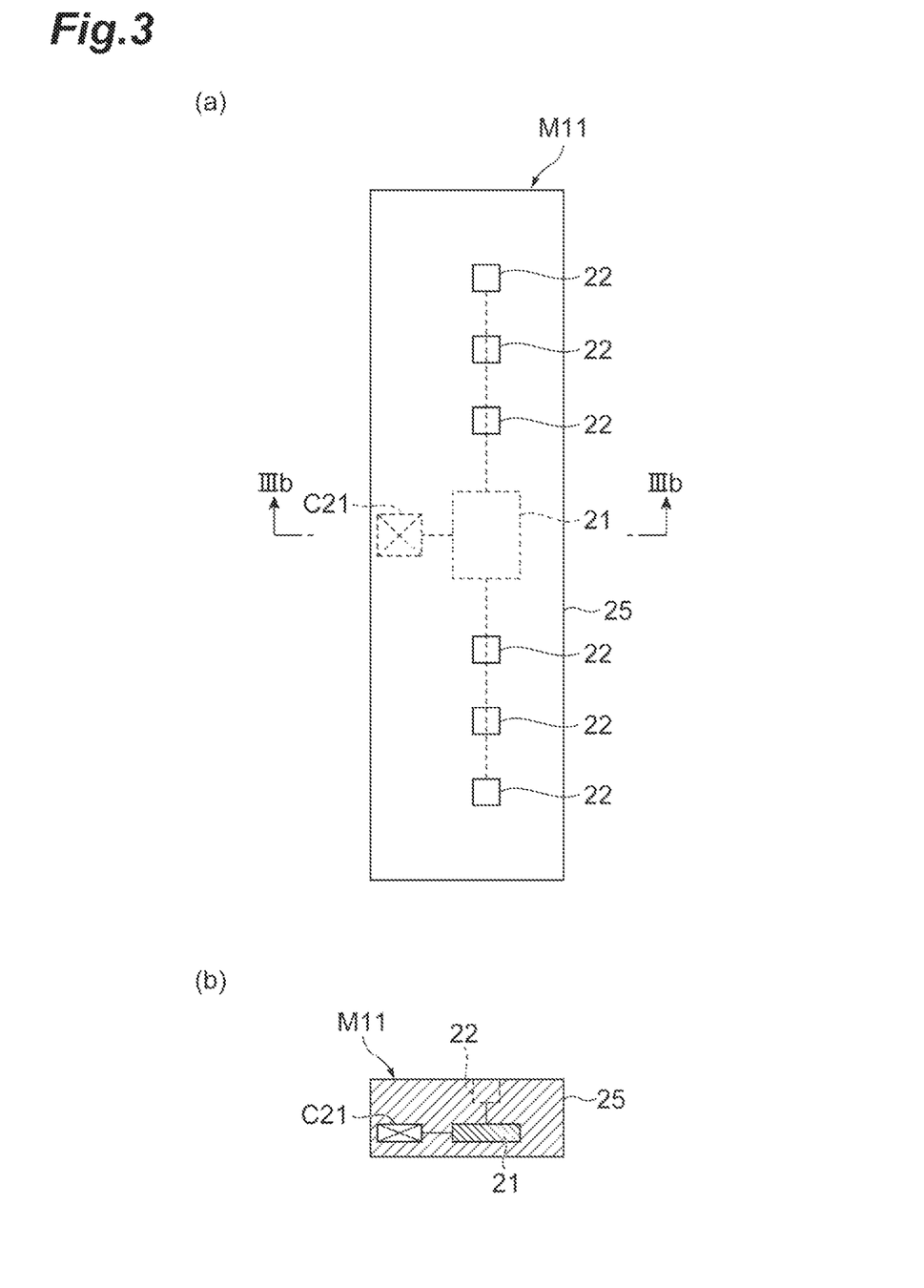
FIG. 3(a) is a view of marks seen from above.
FIG. 3(b) is a cross-sectional view taken along line IIIb-IIIb in FIG. 3(a).

As illustrated in FIGS. 3(*a*) and 3(*b*), the mark M11 includes the light emitting power receiving coil C21, a rectifier circuit 21, a plurality of LEDs (light emitting bodies) 22, and a mark casing 25. For example, a resonant capacitor and the like are provided in the light emitting power receiving coil C21. The light emitting power receiving coil C21 receives power at the second frequency as a resonance frequency. That is, the light emitting power receiving coil C21 wirelessly receives power from the light emitting power transmitting coil C11 via a magnetic field having the second frequency.

Specifically, since the light emitting power receiving coil C21 is present in an AC magnetic field generated by the light emitting power transmitting coil C11, an induced current is generated in the light emitting power receiving coil C21. Accordingly, the light emitting power receiving coil C21 wirelessly receives AC power from the light emitting power transmitting coil C11. That is, the mark M11 is disposed such that the light emitting power receiving coil C21 of the mark M11 is positioned in an AC magnetic field generated by the light emitting power transmitting coil C11.

Power received by the light emitting power receiving coil C21 is supplied to each of the plurality of LEDs 22 via the rectifier circuit 21. The LEDs 22 are disposed in a row in an extending direction of the mark M11. The LEDs 22 emit light with power received by the light emitting power receiving coil C21.

The mark casing 25 accommodates the light emitting power receiving coil C21, the rectifier circuit 21, and the plurality of LEDs 22 which have been described above. At least a lower surface of the mark casing 25 is formed of a material which does not affect the magnetic field (for example, a resin). In addition, at least an upper surface of the mark casing 25 is formed of a transparent material (for example, a resin or glass) such that irradiation light from the LEDs 22 can be transmitted therethrough.

The mark M12 has a configuration similar to that of the mark M11. That is, the light emitting power receiving coil of the mark M12 wirelessly receives power from the light emitting power transmitting coil C12 via a magnetic field having the second frequency. Accordingly, LEDs of the mark M12 emit light.

The light emitting power receiving coil C21 of the mark M11 and the light emitting power receiving coil of the mark M12 are disposed around the ground-side power feeding coil C1 when the ground-side power feeding coil C1 is seen from above.

The marks M11 and M12 are aligned by being respectively fitted in grooves 15*a* provided on the upper surface of the pad casing 15. In the present embodiment, the ground-side power feeding coil C1 has a square shape when seen from above. The marks M11 and M12 are disposed along sides facing each other in the square-shaped ground-side power feeding coil C1. In the present embodiment, the lengths of the marks M11 and M12 are longer than the length of one side of the square-shaped ground-side power feeding coil C1 by a predetermined length.

As illustrated in FIG. 2, the vehicle-side power feeding device 30 mounted in the vehicle V includes the vehicle-side communication unit 31, a vehicle-side control unit 32, and the vehicle-side power feeding coil C2. The vehicle-side communication unit 31 has a function of performing radio communication with the pad-side communication unit 11 of the wireless power transfer pad 10. The vehicle-side control unit 32 issues an instruction for turning on and turning off the marks M11 and M12 based on an operation or the like of a driver, an instruction or the like for starting power supply to the vehicle V using the ground-side power feeding coil C1, and the like to the wireless power transfer pad 10 via the vehicle-side communication unit 31. For example, the vehicle-side control unit 32 is constituted of an electronic control unit (ECU) including a central processing unit (CPU), a read only memory (ROM), and a random access memory (RAM).

For example, a resonant capacitor and the like are provided in the vehicle-side power feeding coil C2. The vehicle-side power feeding coil C2 receives power at the first frequency as a resonance frequency. That is, the vehicle-side power feeding coil C2 wirelessly receives power from the ground-side power feeding coil C1 via a magnetic field having the first frequency. Specifically, since the vehicle-side power feeding coil C2 is present in an AC magnetic field generated by the ground-side power feeding coil C1, an induced current is generated in the vehicle-side power feeding coil C2. Accordingly, the vehicle-side power feeding coil C2 wirelessly receives AC power from the ground-side power feeding coil C1. Power received by the vehicle-side power feeding coil C2 is utilized for charging a battery of the vehicle V via a rectifier circuit, a charging circuit, or the like.

As described above, power transmission from the ground-side power feeding coil C1 to the vehicle-side power feeding coil C2 and power transmission from the light emitting power transmitting coil C11 to the mark M11 are performed by using frequencies different from each other (first frequency and second frequency). As described above, power transmission from the ground-side power feeding coil C1 to the vehicle-side power feeding coil C2 and power transmission from the light emitting power transmitting coil C12 to the mark M12 are performed by using frequencies different from each other (first frequency and second frequency). Moreover, resonant capacitors are respectively provided in the vehicle-side power feeding coil C2 and the light emitting power receiving coil C21. Their resonance frequencies are the first frequency and the second frequency. That is, the vehicle-side power feeding coil C2 receives power transmission at the first frequency and the light emitting power receiving coil C21 receives power transmission at the second frequency, selectively. Accordingly, the marks M11 and M12 do not emit light due to a magnetic field generated by the ground-side power feeding coil C1. Similarly, the vehicle-side power feeding coil C2 does not receive power due to magnetic fields generated by the light emitting power transmitting coils C11 and C12.

Next, a flow of turning-on processing of the marks M11 and M12 performed before power transmission from the wireless power transfer pad 10 to the vehicle V starts will be described. First, a case in which the driver of the vehicle V confirms the mark M11 or the like visually and the vehicle V is moved toward the wireless power transfer pad 10 will be described.

Figure 4:
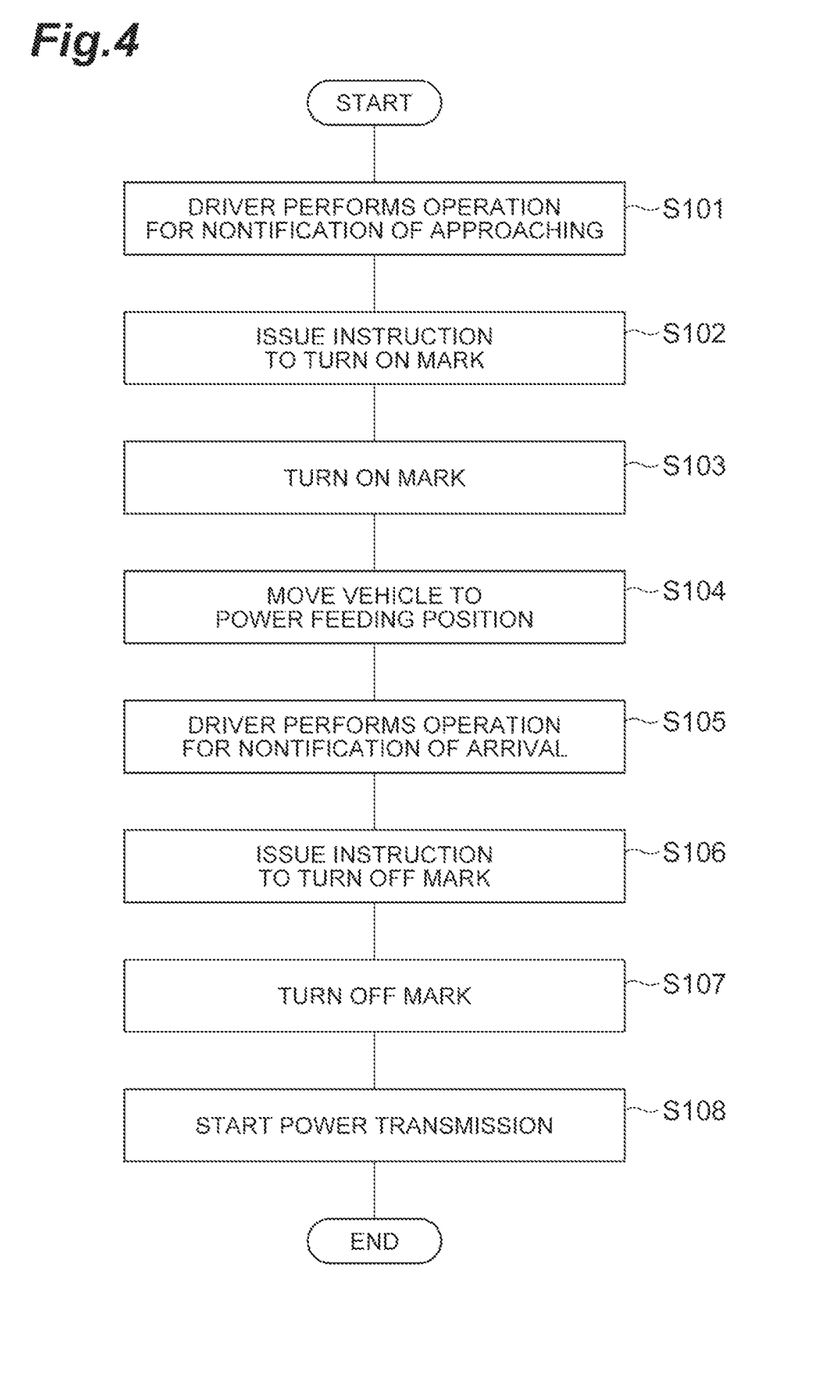
FIG. 4 is a flowchart illustrating a flow of turning-on processing of the marks when a driver confirms the marks in a visually recognizing manner and a vehicle is moved in a manual driving mode.

As illustrated in FIG. 4, the driver of the vehicle V operates an operation button or the like (not illustrated) mounted in the vehicle V to notify the vehicle-side control unit 32 of the fact that the vehicle V has approached the wireless power transfer pad 10 (S101). The vehicle-side control unit 32 instructs the wireless power transfer pad 10 to turn on the mark, via the vehicle-side communication unit 31 (S102). When the pad-side communication unit 11 receives the instruction to turn on the mark, the pad-side control unit 12 outputs a mark power feeding signal to the mark power transmission circuit 14. Accordingly, the marks M11 and M12 emit light, and the marks M11 and M12 are switched from a turned-off state to a turned-on state (S103).

The driver moves the vehicle V to a place on the wireless power transfer pad 10 (position where wireless power transfer can be performed) in a manual driving mode while viewing the marks M11 and M12 emitting light (S104). When the vehicle V arrives at the place on the wireless power transfer pad 10, the driver stops the vehicle V. Then, the driver operates an operation button or the like (not illustrated) mounted in the vehicle V to notify the vehicle-side control unit 32 of the fact that the vehicle V has arrived at the place on the wireless power transfer pad 10 (S105). The vehicle-side control unit 32 instructs the wireless power transfer pad 10 to turn off the mark, via the vehicle-side communication unit 31 (S106).

When the pad-side communication unit 11 receives the instruction to turn off the mark, the pad-side control unit 12 stops outputting a mark power feeding signal to the mark power transmission circuit 14. Accordingly, the mark power transmission circuit 14 stops supplying AC power to the light emitting power transmitting coils C11 and C12. Since AC power has stopped being supplied to the light emitting power transmitting coils C11 and C12, the marks M11 and M12 are turned off (S107). Thereafter, the pad-side control unit 12 outputs a vehicle power feeding signal to the vehicle power transmission circuit 13. Accordingly, power transmission from the wireless power transfer pad 10 to the vehicle V starts (S108).

Figure 5:
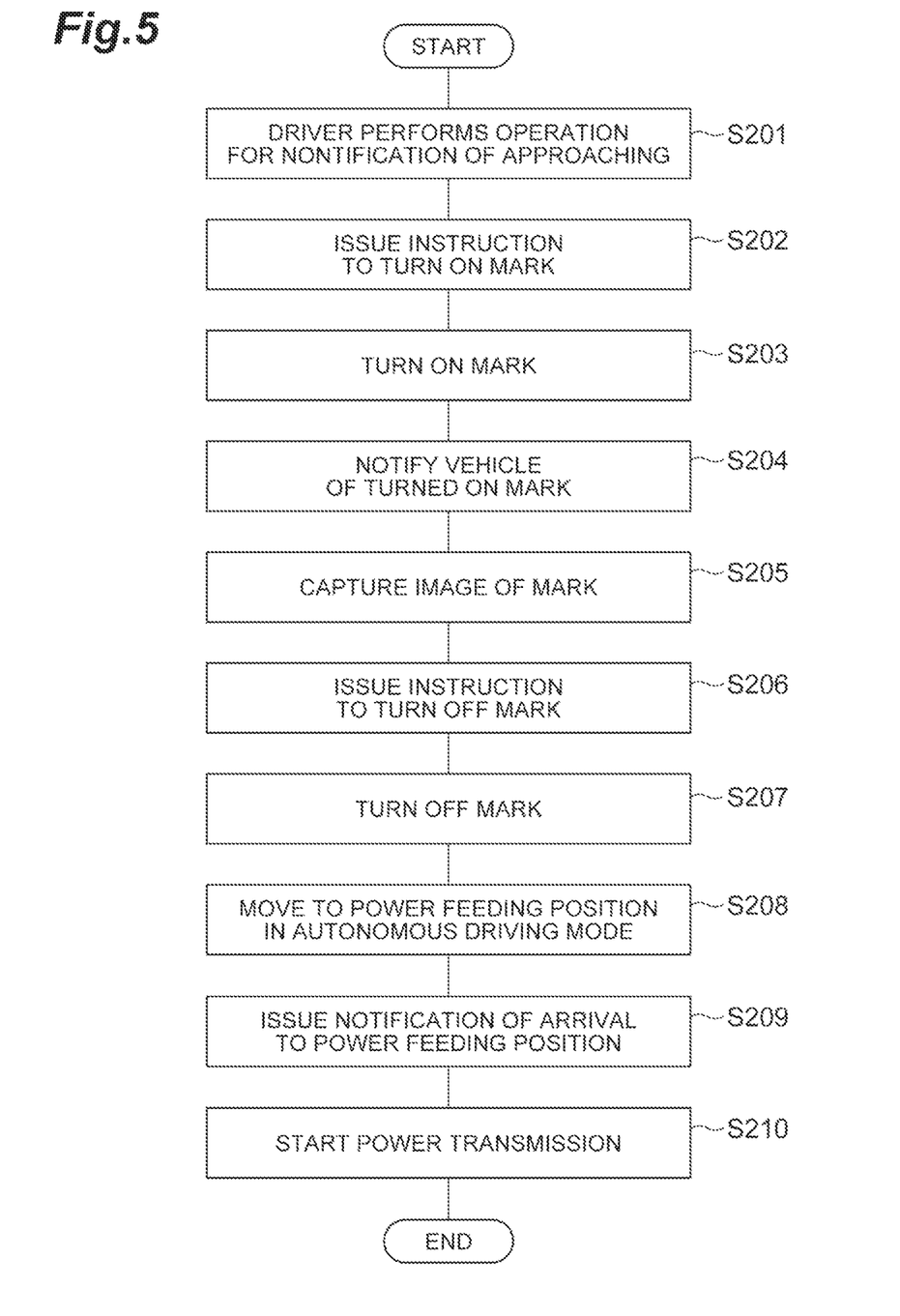
FIG. 5 is a flowchart illustrating a flow of turning-on processing of the marks when the marks are identified based on an image captured by a camera and a vehicle is moved in an autonomous driving mode.

Next, a case in which the vehicle V is a vehicle capable of being autonomously driven, and the vehicle V is caused to move to the place on the wireless power transfer pad 10 in an autonomous driving mode when the vehicle-side control unit 32 executes autonomous driving control will be described. Here, a camera mounted in the vehicle V captures an image of the marks M11 and M12. The vehicle-side control unit 32 identifies the positions of the marks M11 and M12 based on the captured image and causes the vehicle V to move.

Since processing of S201 to S203 illustrated in FIG. 5 is similar to the processing of S101 to S103 described by using FIG. 4, description thereof will be omitted. When the marks M11 and M12 emit light, the pad-side control unit 12 notifies the vehicle V side of the fact that the marks M11 and M12 have emitted light, via the pad-side communication unit 11 (S204). When the vehicle-side communication unit 31 is notified of the fact that the marks M11 and M12 have emitted light, the vehicle-side control unit 32 controls a camera (not illustrated) mounted in the vehicle V to capture an image of a region including the marks M11 and M12 by using the camera (S205). When the driver visually recognizes the marks M11 and M12, the marks M11 and M12 are required to emit visible light. On the other hand, when a camera captures an image of the marks M11 and M12, or the like, the marks M11 and M12 may emit light other than visible light (for example, infrared light) as long as its image can be captured by the camera. After an image of the marks M11 and M12 is captured, the vehicle-side control unit 32 instructs the wireless power transfer pad 10 to turn off the mark, via the vehicle-side communication unit 31 (S206).

When the pad-side communication unit 11 receives the instruction to turn off the mark, the pad-side control unit 12 stops outputting a mark power feeding signal to the mark power transmission circuit 14. Accordingly, the marks M11 and M12 are turned off (S207). The vehicle-side control unit 32 recognizes the positions of the marks M11 and M12 based on the image captured by the camera. The vehicle-side control unit 32 causes the vehicle V to move to the place on the wireless power transfer pad 10 (position where wireless power transfer can be performed) in an autonomous driving mode based on the identified positions of the marks M11 and M12 (S208). The vehicle-side control unit 32 can detect the marks M11 and M12 from an image captured by the camera and can recognize the positions of the marks M11 and M12 with respect to the vehicle V, based on a known technology of image processing.

When the vehicle V arrives at the place on the wireless power transfer pad 10, the vehicle-side control unit 32 causes the vehicle V to stop. Then, the vehicle-side control unit 32 notifies the wireless power transfer pad 10 of the fact that the vehicle V has arrived at the place on the wireless power transfer pad 10, via the vehicle-side communication unit 31 (S209). When the pad-side communication unit 11 is notified of the fact that the vehicle V has arrived at the place on the wireless power transfer pad 10, the pad-side control unit 12 outputs a vehicle power feeding signal to the vehicle power transmission circuit 13. Accordingly, power transmission from the wireless power transfer pad 10 to the vehicle V starts (S210).

In this manner, in either case when the driver of the vehicle V confirms the mark M11 and the like in a visually recognizing manner or when a camera captures an image of the mark M11 and the like, the pad-side control unit 12 causes the marks M11 and M12 to emit light when an instruction of turning on the mark (light emission start signal) is received by the pad-side communication unit 11 (S103 and S203). Then, after the marks M11 and M12 are caused to emit light, the pad-side control unit 12 causes the marks M11 and M12 to be turned off before power transmission from the wireless power transfer pad 10 to the vehicle V starts (S107 and S207).

The present embodiment is constituted as described above. This ground-side power feeding device 1 wirelessly transmits power from the light emitting power transmitting coils C11 and C12 to the light emitting power receiving coil C21 provided in the mark M11 and the light emitting power receiving coil provided in the mark M12. That is, there is no need to directly connect the marks M11 and M12 and the power source provided on the traveling road surface R side to each other using a wiring. Moreover, the mark casing 25 (marks M11 and M12) and the pad casing 15 are separate casings. Since the mark casing 25 (marks M11 and M12) is aligned by being fitted in the pad casing 15, both can be easily separated from each other. Therefore, in the ground-side power feeding device 1, only the marks M11 and M12 can be replaced easily. In addition, a frequency (first frequency) used for power transmission and power reception between the ground-side power feeding coil C1 and the vehicle-side power feeding coil C2 and a frequency (second frequency) used for power transmission and power reception between the light emitting power transmitting coil C11 and the light emitting power receiving coil C21 are different from each other. Therefore, power transmission from the wireless power transfer pad 10 to the vehicle V and light emission of the marks M11 and M12 can be independently controlled.

The light emitting power receiving coil C21 of the mark M11 and the light emitting power receiving coil of the mark M12 are disposed around the ground-side power feeding coil C1 when the ground-side power feeding coil C1 is seen from above. Most of magnetic fields generated for wireless power transfer between the ground-side power feeding coil C1 and the vehicle-side power feeding coil C2 are generated between the ground-side power feeding coil C1 and the vehicle-side power feeding coil C2, and the magnetic field becomes weak around thereof. Therefore, the light emitting power receiving coil C21 of the mark M11 or the like can be prevented from affecting power transmission from the ground-side power feeding coil C1 to the vehicle-side power feeding coil C2.

The marks M11 and M12 are required to indicate the installation position of the ground-side power feeding coil C1 for the vehicle V approaching the wireless power transfer pad 10. In addition, when power transmission is performed from the wireless power transfer pad 10 to the vehicle V, the marks M11 and M12 do not have to emit light. Therefore, the pad-side control unit 12 causes the marks M11 and M12 to emit light when an instruction to turn on the mark is received. Then, after the marks M11 and M12 are caused to emit light, the pad-side control unit 12 stops the marks M11 and M12 emitting light before power transmission from the wireless power transfer pad 10 to the vehicle V starts. Accordingly, the ground-side power feeding device 1 can cause the marks M11 and M12 to suitably emit light in accordance with a timing required for the marks M11 and M12. In addition, since the marks M11 and M12 emit light only when required, such as when the vehicle V approaches the wireless power transfer pad 10, the fine view of the region, in which the ground-side power feeding device 1 is installed, is not impaired.

First Modification Example

Figure 6:
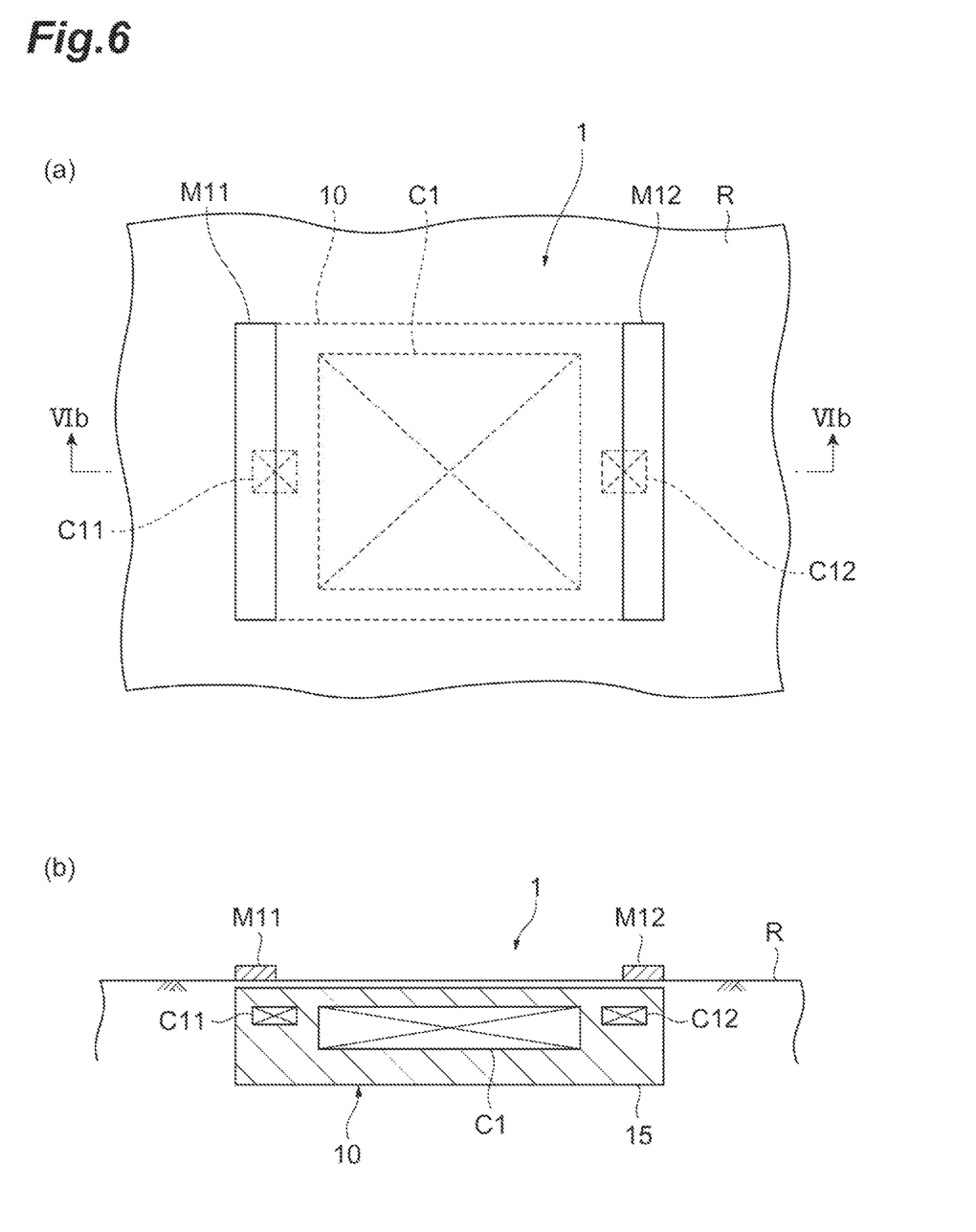
FIG. 6(a) is a view of a ground-side power feeding device according to a first modification example seen from above.
FIG. 6(b) is a cross-sectional view taken along line VIb-VIb in FIG. 6(a).

Next, a first modification example of the foregoing embodiment will be described. In the foregoing embodiment, the marks M11 and M12 are embedded in the traveling road surface R such that their upper surfaces are exposed. In place thereof, FIGS. 6(a) and 6(b), the marks M11 and M12 may be installed on the traveling road surface R. The installation positions of the marks M11 and M12 may be determined based on a measured position of the wireless power transfer pad 10 by measuring the position where the wireless power transfer pad 10 is embedded, based on an external reference point or the like. Since the marks M11 and M12 are installed on the traveling road surface R, it is easier to replace the marks M11 and M12 in the ground-side power feeding device 1 of the first modification example.

Second Modification Example

Figure 7:
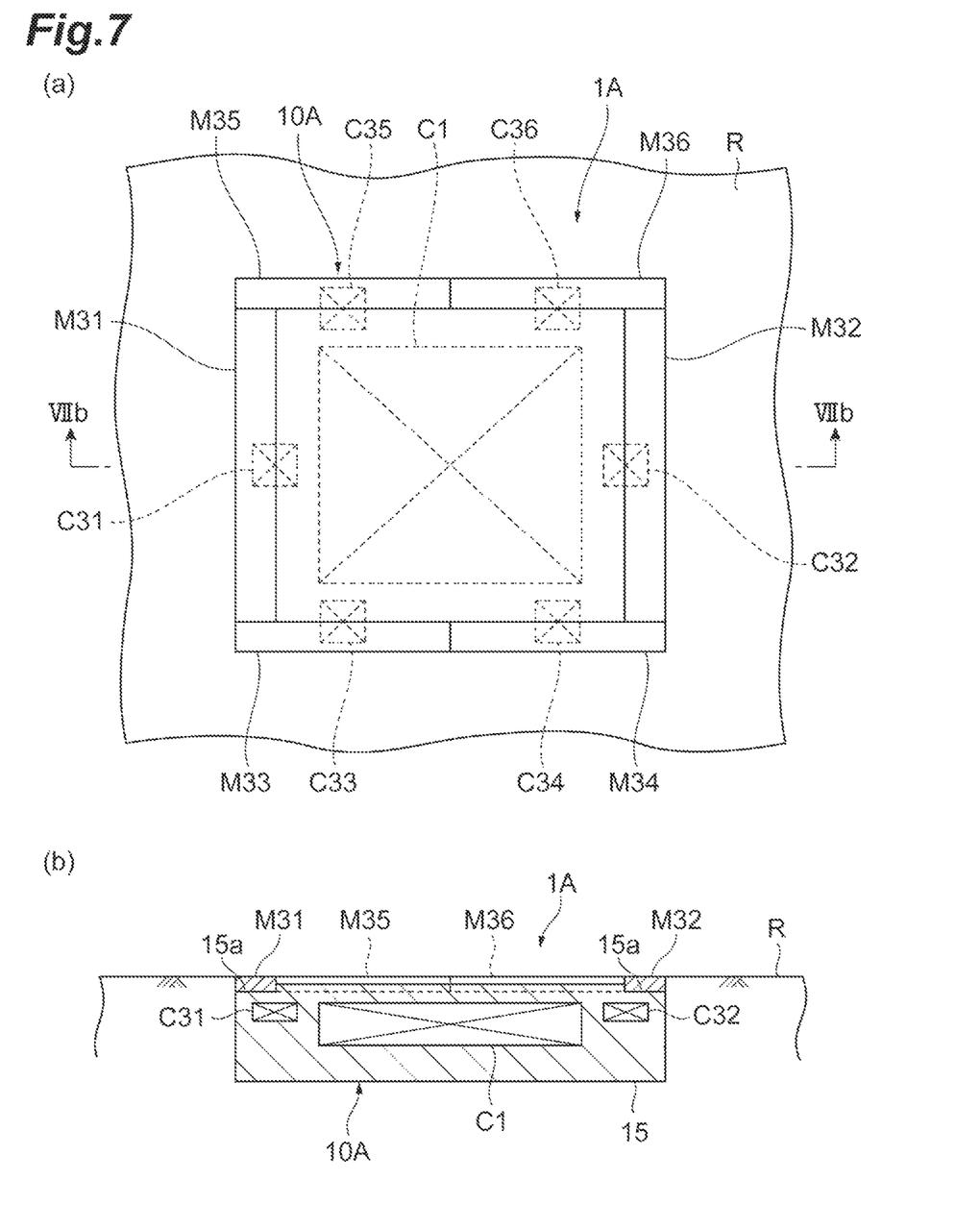
FIG. 7(a) is a view of a ground-side power feeding device according to a second modification example seen from above.
FIG. 7(b) is a cross-sectional view taken along line VIIb-VIIb in FIG. 7(a).

A second modification example of the foregoing embodiment will be described. As illustrated in FIGS. 7(*a*) and 7(*b*), a ground-side power feeding device 1A in the second modification example includes marks (light emitting units) M31, M32, M33, M34, M35, and M36, in place of the marks M11 and M12 of the ground-side power feeding device 1 in the embodiment. Each of the marks M31 to M36 has a configuration similar to that of the mark M11 in the embodiment. In addition, a wireless power transfer pad 10A of the ground-side power feeding device 1A in the second modification example includes light emitting power transmitting coils C31, C32, C33, C34, C35, and C36, in place of the light emitting power transmitting coils C11 and C12 of the wireless power transfer pad 10 in the embodiment.

The light emitting power transmitting coil C31 wirelessly transmits power to the light emitting power receiving coil of the mark M31 via a magnetic field having the second frequency. Similarly, the light emitting power transmitting coils C32 to C36 wirelessly transmit power to the light emitting power receiving coils of the marks M32 to M36 respectively via a magnetic field having the second frequency.

The marks M31 to M36 are embedded in the traveling road surface R such that the upper surface is exposed to the traveling road surface R. The marks M31 to M36 are disposed in a row in a square frame shape around the ground-side power feeding coil C1 such that the ground-side power feeding coil C1 is surrounded. The light emitting power receiving coils of the marks M31 to M36 and the light emitting power transmitting coils C31 to C36 are disposed around the ground-side power feeding coil C1 when the ground-side power feeding coil C1 is seen from above. The marks M31 to M36 are aligned by being fitted in the frame-shaped grooves 15*a* provided on the upper surface of the pad casing 15.

The ground-side power feeding device 1A of the second modification example also exhibits operational effects similar to those of the ground-side power feeding device 1 of the embodiment. In addition, since the ground-side power feeding coil C1 is surrounded with the marks M31 to M36, a driver or the like can clearly ascertain the installation position of the ground-side power feeding coil C1.

Third Modification Example

Figure 8:
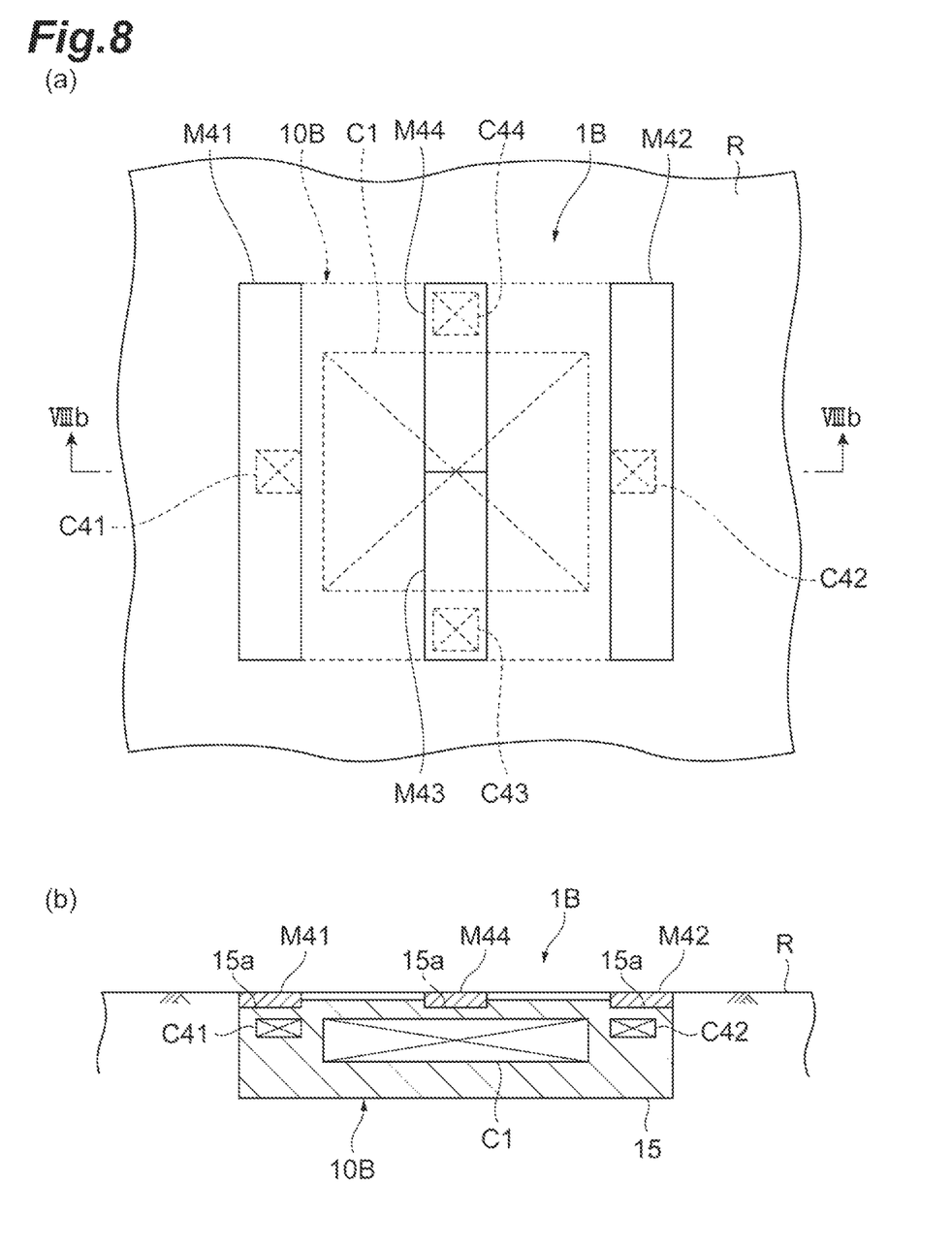
FIG. 8(a) is a view of a ground-side power feeding device according to a third modification example seen from above.
FIG. 8(b) is a cross-sectional view taken along line VIIIb-VIIIb in FIG. 8(a).

A third modification example of the foregoing embodiment will be described. As illustrated in FIGS. 8(*a*) and 8(*b*), a ground-side power feeding device 1B in the third modification example includes marks (light emitting units) M41, M42, M43, and M44, in place of the marks M11 and M12 of the ground-side power feeding device 1 in the embodiment. The marks M41 to M44 have a configuration similar to that of the mark M11 in the embodiment. In addition, a wireless power transfer pad 10B of the ground-side power feeding device 1B in the third modification example includes light emitting power transmitting coils C41, C42, C43, and C44, in place of the light emitting power transmitting coils C11 and C12 of the wireless power transfer pad 10 in the embodiment.

The light emitting power transmitting coil C41 wirelessly transmits power to the light emitting power receiving coil of the mark M41 via a magnetic field having the second frequency. Similarly, the light emitting power transmitting coils C42 to C44 wirelessly transmit power to the light emitting power receiving coils of the marks M42 to M44 respectively via a magnetic field having the second frequency.

The marks M41 to M44 are embedded in the traveling road surface R such that the upper surface is exposed to the traveling road surface R. The marks M41 and M42 are disposed such that the ground-side power feeding coil C1 is interposed therebetween when seen from above. The marks M43 and M44 are linearly arranged and are disposed between the mark M41 and the mark M44. The marks M43 and M44 are disposed across the ground-side power feeding coil C1 when the ground-side power feeding coil C1 is seen from above. That is, at least a part of the marks M43 and M44 is disposed in the upper portion of the ground-side power feeding coil C1. The mark M41, the marks M43 and M44 which are linearly arranged, and the mark M42 are disposed such that their extending directions become the same as each other.

The light emitting power receiving coils of the marks M41 to M44, and the light emitting power transmitting coils C41 to C44 are disposed around the ground-side power feeding coil C1 when the ground-side power feeding coil C1 is seen from above. The marks M41 to M44 are aligned by being fitted in the frame-shaped grooves 15*a* provided on the upper surface of the pad casing 15.

Figure 9:
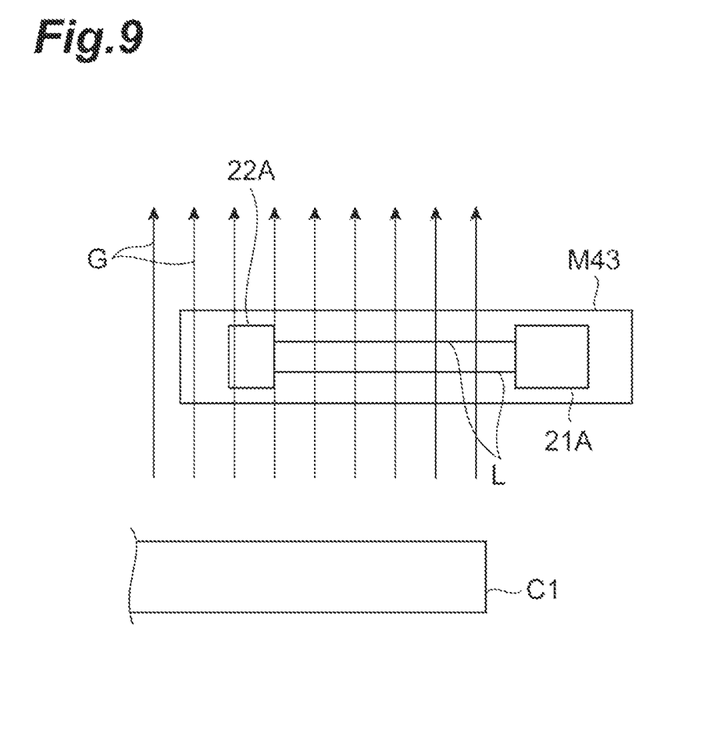
FIG. 9 is a view illustrating an arrangement of a wiring of an LED provided in a mark when the mark is seen from a side.

Here, the mark M43 will be described in detail. As illustrated in FIG. 9, a rectifier circuit 21A of the mark M43 is disposed around the ground-side power feeding coil C1 when the ground-side power feeding coil C1 is seen from above. In FIG. 9, the light emitting power receiving coil is not illustrated. That is, the rectifier circuit 21A is positioned outside the region of a magnetic field formed between the ground-side power feeding coil C1 and the vehicle-side power feeding coil C2. In FIG. 9, the ground-side power feeding coil C1 is a circular coil, and the direction of the magnetic field is indicated with an arrow G That is, the ground-side power feeding coil C1 has a spirally wound conductive wire when seen from above. In FIG. 9, the direction of the magnetic field is an up-down direction (upward from below).

A LED 22A of the mark M43 is positioned on the ground-side power feeding coil C1 when the ground-side power feeding coil C1 is seen from above. That is, the LED 22A is positioned within the region of a magnetic field formed between the ground-side power feeding coil C1 and the vehicle-side power feeding coil C2. A set of wirings L connecting the LED 22A and the rectifier circuit 21A to each other is disposed in a row in the up-down direction along the direction of the magnetic field (direction of the arrow G). That is, when seen in the direction of the magnetic field (in the up-down direction), the wirings L in a set overlap each other. The mark M44 has a configuration similar to that of the mark M43 as well.

The ground-side power feeding device 1B of the third modification example exhibits operational effects similar to those of the ground-side power feeding device 1 of the embodiment. In addition, in the mark M43, since the set of wirings L is disposed in a row in the up-down direction along the direction of the magnetic field, a magnetic field generated between the ground-side power feeding coil C1 and the vehicle-side power feeding coil C2 is not interlinked with the wirings L. Similar to the mark M43, in the mark M44 as well, a magnetic field generated between the ground-side power feeding coil C1 and the vehicle-side power feeding coil C2 is not interlinked with the wirings in the mark M44. Accordingly, the marks M43 and M44 can be prevented from emitting light due to the current induced to the wirings during power transmission from the wireless power transfer pad 10B to the vehicle V.

In the third modification example, a circular coil is adopted as the ground-side power feeding coil C1. However, a solenoid coil may be adopted. In this case, the direction of a magnetic field between the ground-side power feeding coil C1 and the vehicle-side power feeding coil C2 becomes a horizontal direction. Therefore, the set of wirings L of the mark M43 is disposed in a row in the horizontal direction along the direction of the magnetic field. That is, when seen in the direction of the magnetic field (in the horizontal direction), the wirings L in a set overlap each other. The mark M44 has a configuration similar to that of the mark M43 as well.

Fourth Modification Example

Figure 10:
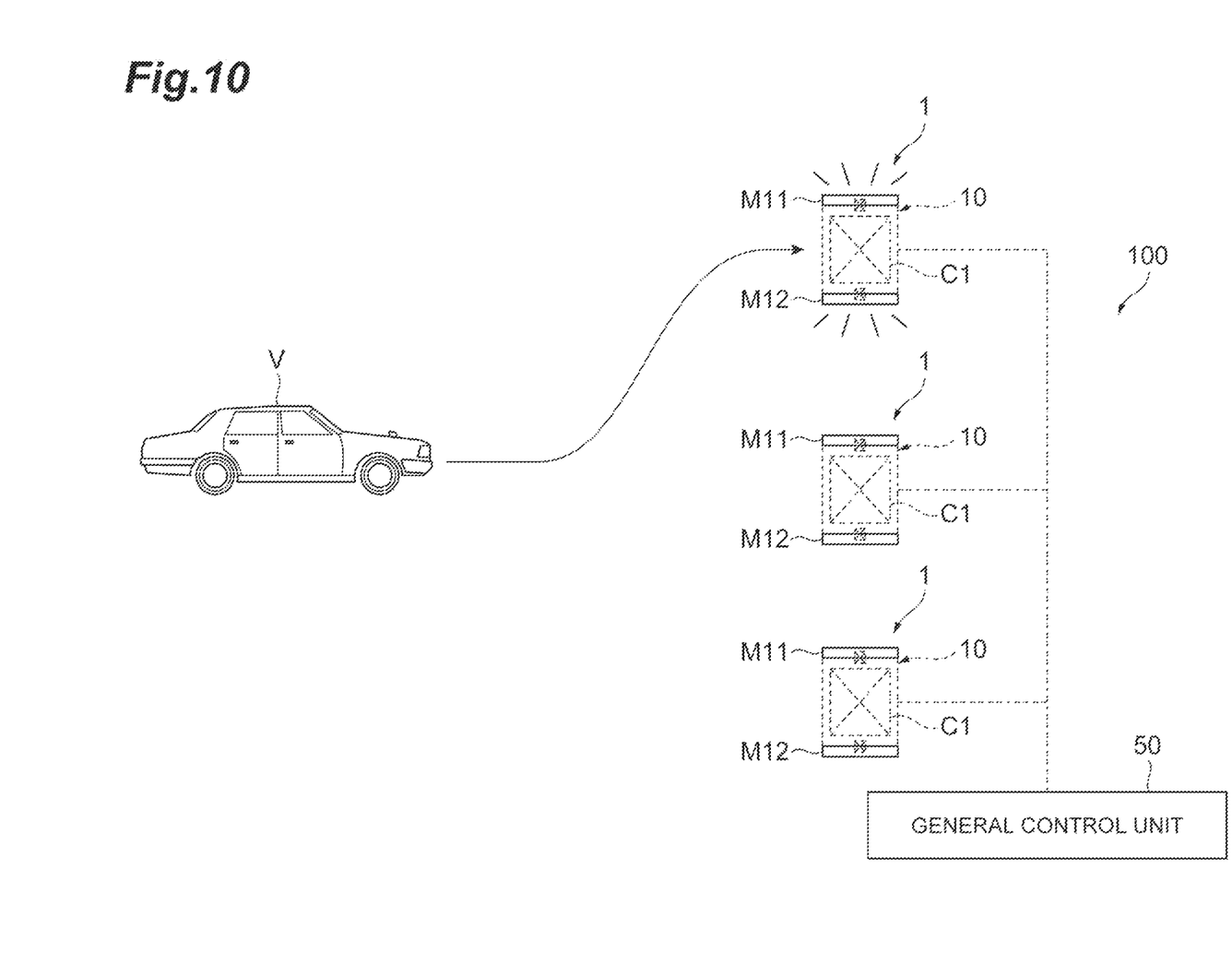
FIG. 10 is a view illustrating a wireless power transfer system according to a fourth modification example.

A fourth modification example of the foregoing embodiment will be described. As illustrated in FIG. 10, a wireless power transfer system 100 includes a plurality of ground-side power feeding devices 1 (FIG. 10 illustrates a case of three ground-side power feeding devices 1) in the embodiment, and a general control unit 50. The general control unit 50 may be provided in the pad casing 15 of one ground-side power feeding device 1 of the plurality of ground-side power feeding devices 1 or may be provided separately from the ground-side power feeding device 1.

The general control unit 50 determines a ground-side power feeding device 1 of the plurality of ground-side power feeding devices 1 to be used for power transmission. For example, the general control unit 50 excludes a ground-side power feeding device 1 which cannot perform desired power transmission due to a foreign object on the wireless power transfer pad 10 or a flaw in power transmission, from candidates to be used for power transmission. For example, the general control unit 50 may determine a ground-side power feeding device 1 to be used for power transmission in accordance with the kind of the vehicle V (a compact vehicle, a heavy vehicle, and the like). When the general control unit 50 is notified by the vehicle V of the fact that the vehicle V has approached the installation place of the ground-side power feeding device 1, the general control unit 50 determines the ground-side power feeding device 1 to be used. Then, the general control unit 50 causes the marks M11 and M12 of the ground-side power feeding device 1 determined to be used to be turned on. Thereafter, the ground-side power feeding device 1 determined to be used performs power transmission to the vehicle V as described above.

In this manner, when the plurality of ground-side power feeding devices 1 are installed, the wireless power transfer system 100 causes the marks M11 and M12 of a predetermined ground-side power feeding device 1 to emit light. Accordingly, even when a plurality of ground-side power feeding devices 1 are installed, the wireless power transfer system 100 can induce the vehicle V to a ground-side power feeding device 1 suitable for power transmission. In the fourth modification example, the wireless power transfer system 100 includes a plurality of ground-side power feeding devices 1 in the embodiment. The wireless power transfer system 100 is not limited thereto and may include a plurality of ground-side power feeding devices in other modification examples.

Hereinabove, the embodiment and the modification examples of the present disclosure have been described. However, the present disclosure is not limited to the foregoing embodiment and the modification examples. For example, the places to dispose the mark M11 and the like are not limited to those described above. For example, marks may be disposed in a cross shape on the ground-side power feeding coil C1 when the ground-side power feeding coil C1 is seen from above.

The mark M11 and the like may emit light using a light emitting body other than an LED. The color of emission light of the mark M11 and the like may vary for each mark. The amount of light of the mark M11 and the like in the embodiment and the modification examples may change in accordance with the time of the day, surrounding brightness, or the like. For example, in the morning and the evening (times of the day having a possibility that the mark M11 and the like are unlikely to be recognized due to sun light illuminated laterally), the mark power transmission circuit 14 may increase the amount of light of the mark M11 and the like by increasing the output power. In addition, at night, the mark power transmission circuit 14 may reduce the amount of light of the mark M11 and the like by reducing the output power. In order to ascertain the time of the day, such as the morning, the evening, or the like, the wireless power transfer pad 10 may include a timepiece.

In addition, in the foregoing embodiment and the modification examples, a case of performing power transmission from the wireless power transfer pads 10, 10A, or 10B side to the vehicle V have been described as examples. However, a configuration in which power transmission is performed from the vehicle V side to the wireless power transfer pad 10, 10A, or 10B side can be adopted.

INDUSTRIAL APPLICABILITY

According to the present disclosure, a light emitting unit provided in a ground-side power feeding device can be replaced easily.

REFERENCE SIGNS LIST

1 Ground-side power feeding device
11 Pad-side communication unit (ground-side communication unit)
12 Pad-side control unit (light emission control unit)
C1 Ground-side power feeding coil
C2 Vehicle-side power feeding coil
C11, C12, C31 to C36, C41 to C44 Light emitting power transmitting coil
C21 Light emitting power receiving coil
M11, M12, M31 to M36, M41 to M44 Mark (light emitting unit)
22 LED (light emitting body)
R Traveling road surface
V Vehicle

The invention claimed is:
1. A ground-side power feeding device that is installed on a traveling road surface, on which a vehicle travels, and wirelessly transmits or receives power to or from the vehicle, the ground-side power feeding device comprising:

a ground-side power feeding coil that wirelessly transmits or receives power to or from a vehicle-side power feeding coil mounted in the vehicle via a magnetic field having a first frequency;

a light emitting unit that is disposed at any position at least around the ground-side power feeding coil and in an upper portion of the ground-side power feeding coil when the ground-side power feeding coil is seen from above; and a light emitting power transmitting coil that wirelessly transmits power to the light emitting unit, wherein the light emitting unit has a light emitting power receiving coil which wirelessly receives power from the light emitting power transmitting coil via a magnetic field having a second frequency different from the first frequency, and a light emitting body which emits light with power received by the light emitting power receiving coil.

2. The ground-side power feeding device according to claim 1, wherein the light emitting power transmitting coil and the light emitting power receiving coil are disposed around the ground-side power feeding coil when the ground-side power feeding coil is seen from above.

3. The ground-side power feeding device according to claim 1, further comprising:

a light emission control unit that controls a state of power transmission from the light emitting power transmitting coil to the light emitting power receiving coil; and a ground-side communication unit that performs communication with the vehicle, wherein the light emission control unit starts power transmission from the light emitting power transmitting coil to the light emitting power receiving coil when a light emission start signal is received by the ground-side communication unit, and stops power transmission from the light emitting power transmitting coil to the light emitting power receiving coil before the ground-side power feeding coil starts power transmission or power reception between the ground-side power feeding coil and the vehicle-side power feeding coil after power transmission from the light emitting power transmitting coil to the light emitting power receiving coil has started.

4. The ground-side power feeding device according to claim 2, further comprising:

a light emission control unit that controls a state of power transmission from the light emitting power transmitting coil to the light emitting power receiving coil; and a ground-side communication unit that performs communication with the vehicle, wherein the light emission control unit starts power transmission from the light emitting power transmitting coil to the light emitting power receiving coil when a light emission start signal is received by the ground-side communication unit, and stops power transmission from the light emitting power transmitting coil to the light emitting power receiving coil before the ground-side power feeding coil starts power transmission or power reception between the ground-side power feeding coil and the vehicle-side power feeding coil after power transmission from the light emitting power transmitting coil to the light emitting power receiving coil has started.

* * * * *